VINYL COATING COMPOSITION FOR FLEXIBLE FILMS

Ralph T. K. Cornwell, Rosemont, Pa., assignor to American Viscose Corporation, Philadelphia, Pa., a corporation of Delaware
No Drawing. Filed Nov. 23, 1959, Ser. No. 854,571
6 Claims. (Cl. 117—145)

This invention relates to an improved vinyl resin coating for flexible sheets. More particularly it relates to the vinyl resin coating composition which produces glossy, crystal-clear, cockling-resistant film for wrapping food products, e.g., bread and cakes.

The production of a wrapping material, which is commercially competitive with conventional nitrocellulose coated cellophane and demonstrates improved coating properties, has long been a goal of those skilled in this art. Saran-type coatings for cellophane have produced much improved wrapping film. However, this copolymeric coating material is much more expensive than nitrocellulose coatings and because of this, the bulk of cellophane wrapping material produced at this time is nitrocellulose coated.

It is an object of the present invention to produce a less expensive polymer coating for food wrapping films.

Another object of this invention is to produce a specified vinyl resin coated film having improved properties over conventional nitrocellulose coated film and improved gloss.

Still another object of this invention is to produce a vinyl resin coated film which has improved machineability particularly when used with the Simplex bag machine.

To meet the foregoing objects and others, and in accordance with the present invention, an improved coating composition for flexible film comprises from about 70 to 90% by weight of a modified vinyl resin containing from about 75 to 95% by weight of vinyl chloride, from about 4 to 24% by weight of vinyl acetate and from about 0.2 to about 4.0% of an aliphatic alpha-beta monoolefinic carboxylic acid; from about 5 to 25% by weight of acetylated tri-($C_1$–$C_6$) alkyl citrate, from about 2 to 10% by weight of a moistureproofing wax, and from 1 to 10% by weight of a blending agent capable of inducing compatibility among the components of composition.

The modified vinyl resin mentioned above is covered by U.S. Patent No. 2,329,456, and the incorporation of an aliphatic alpha-beta monoolefinic carboxylic acid in the vinyl resin is taught in the patent to produce much greater adherence of the resin to substrata. In the present invention, the incorporation of an aliphatic alpha-beta monoolefinic carboxylic acid appears to promote compatibility of the film former resin with the other components of the coating composition and its presence produces clearer and glossier films. Useful aliphatic monoolefinic carboxylic acids include maleic acid and its anhydride, benzyl maleic acid, citraconic acid, itaconic acid, crotonic acid, acrylic acid, methacrylic and chloromaleic acid.

In a preferred embodiment of this invention, the coating composition comprises from about 70 to 90% by weight of a modified vinyl resin containing from about 80 to 90% by weight of vinyl chloride, about 9 to 18% by weight of vinyl acetate, and from about 0.2 to 4.0% by weight of an alkyl alpha-beta monoolefinic dicarboxylic acid; from about 5 to 25% by weight of an acetylated tri-($C_2$–$C_4$) alkyl citrate, from about 2 to 10% by weight of a moistureproofing paraffin wax and from about 1 to 10% by weight of a modified rosin ester blending agent.

In a more preferred embodiment of this invention the coating composition consists essentially of from about 75 to 80% by weight of a modified vinyl resin containing about 84 to 85% by weight of vinyl chloride, about 10 to 15% by weight of vinyl acetate, and about 0.5 to 1.5% by weight of maleic acid; about 10 to 16% by weight of acetyl tributyl citrate, about 2 to 6% by weight of maleic anhydride treated rosin ester, from 2 to 10% by weight of a paraffin wax having a melting point range from about 120 to 175° F., from 0 to 1% by weight of blown vegetable oil, particularly rapeseed oil, from 0 to 1% of a micro-crystalline hydrocarbon wax dispersion and from about 0 to 1% of an aqueous clay dispersion.

The vinyl resin of this coating composition has an average molecular weight ranging from about 5,000 to about 25,000.

Generally, the coating composition of this invention is applied to a cellulosic or polyolefin film in the form of a lacquer which comprises from about 5 to 25% by weight of solids and a remainder of organic solvent. The organic solvent material useful for this coating composition includes for example ethyl acetate, butyl acetate, acetone, methyl ethyl ketone, methyl isobutyl ketone, lower alcohols such as methyl and butyl alcohol, ether-alcohols such as the Cellosolves; heptane, benzene, xylene, toluene, and mixtures of these organic liquids. It is preferred that the organic solvent material contain a major proportion of one of the inexpensive organic liquids mentioned, such as toluene, as a diluent.

The composition of the present invention includes a moistureproofing wax material, preferably a paraffin wax. However, other compatible moistureproofing waxy agents such as petrolatum, ceresin, Japan wax, palm wax and various other synthetic waxes or wax-like material can be used.

A blending agent is an essential ingredient of the present coating composition. The blending agent must be capable of inducing compatibility among the components of the composition. In addition to the preferred maleic anhydride treated rosin ester, other compatible blending agents are useful either alone or in combination with the preferred treated rosin. For example, ester gum, rosinates, hydrogenated rosin, hydrogenated rosin esters, damar, copal, kauri, alkyd resins, etc. are useful compatible blending agents.

Blown oils such as vegetable oils including rapeseed oil, castor oil, peanut oil, etc. are extremely beneficial to the composition as lubricants to improve the machineability of coated films. These blown oils also usually help to increase the compatibility of the moistureproofing wax in the composition.

Slip and anti-blocking agents are advantageously incorporated in the coating composition of this invention. A clay-microcrystalline wax dispersion combination has been found especially useful. Other anti-blocking agents which are useful include styrene-butadiene copolymer, calcium silicate, titanium dioxide and other surface agents.

Numerous test runs of regenerated cellulose film coated with the coating composition of this invention have been made. The regenerated cellulose base film used had an average thickness of about 0.9 mil. The coated material was applied to obtain a coating thickness of from about 0.1 to 0.25 mil to one or both surfaces but coatings having thicknesses up to 0.5 mil are useful.

The films coated with compositions coming within the limitations of this invention demonstrated very low water vapor transmission rates of from 3 to 20 grams per square meter per day. Water vapor transmission rates are an indication of the moistureproofness of the coating film and the rates are determined by placing a sheet of test film over a cup containing calcium chloride for a period of not less than 24 hours at 45° F. and 95% relative humidity. The weight of the cup is taken before and after the test to determine the amount of water passing through the film. A water vapor transmission rate of from 3 to 20 grams per square meter per day was considered to be exceptionally good for film having the coating thickness of the described test film.

The heat seals of the films were tested by placing a sheet of coated film against a sheet of the same coated film, coating to coating, and sealing the films together at a temperature of 300° F. under 20 pounds per square inch pressure or 1 second. The adhesion of the test film was measured on the standard Suter Test Machine which measured the force necessary to separate the bonded films. The heat seal of unanchored test film of the invention ran from 50 to 200 grams. On film wherein the base sheet was anchored with 0.15 melamine-formaldehyde precondensate, the heat seal was from 350 to 600 grams. The test films of the invention demonstrated excellent heat seal as determined by the foregoing data.

In blocking and slip tests on films of the invention containing the combination wax-clay dispersion, antiblocking agents, the results were very satisfactory. The films did not block and the slip characteristics were good.

The coated films of the invention also demonstrated superior characteristics when used to wrap edible cakes and breads. The original high gloss of the film was retained. The film demonstrated good cockling resistance producing a much more attractive wrapping as compared to the conventional nitrocellulose coated cellophane and was almost as good in this respect as a commercial Saran coated cellophane. Cockling of film is caused by the unequal contraction and/or expansion of the film in the presence of moisture from the cake, bread or any other moist food to impart an uneven or cockled surface to the film.

In addition to the above improved characteristics, the coated film of this invention demonstrated excellent machineability when used with the Simplex Bag-Forming Machine.

The coating composition which produced the best results in all of the test runs on a regenerated cellulose film of 0.9 mil thickness and primed or anchored with 0.15% melamine-formaldehyde precondensate was one which contained 77.7% Bakelite Vinyl Resin VMCH, a commercially available conjoint polymer containing 86% vinyl chloride, 13% vinyl acetate and 1% maleic acid; 13% acetyl tributyl citrate, 4% Beckacite 1118, a commercially available maleic anhydride treated rosin, 4% of a paraffin wax having a melting point range of from 149 to 151° F., 0.5% blown rapeseed oil, 0.4% Polymekon, a commercially available oxidized microcrystalline hydrocarbon wax dispersion, and 0.4% of an aqueous finely divided clay dispersion (38% clay).

The above described test results of the coating composition and coated film of this invention attest to an unexpected improvement in this art wherein the specified coating composition produces a coated film having a combination of improved characteristics not heretofore known in films of this type.

It is seen from the above description that the objects of the invention are well fulfilled by the structure described. The description is intended to be illustrative only and it is to be understood that changes and variations may be made without departing from the spirit and scope of the invention as defined by the appended claims.

I claim:

1. A composite sheet for wrapping food products comprising a clear, flexible base sheet and a coating on a surface of said base sheet comprising from about 70 to 90% by weight of a modified vinyl resin of from about 75 to 95% of vinyl chloride, from about 24 to 4% by weight of vinyl acetate and from about 4 to about 0.2% by weight of an aliphatic alpha-beta monoolefinic carboxylic acid containing from 3 to 5 carbon atoms; from about 5 to 25% by weight of an acetylated tri-$(C_1-C_6)$ alkyl citrate, from about 2 to 10% by weight of a moistureproofing wax, and from 1 to 10% by weight of a resinous blending agent capable of producing compatibility among the components of the coating.

2. A composite sheet for wrapping food products comprising a clear, flexible base sheet and a coating on a surface of said base sheet comprising from about 70 to 90% by weight of a modified vinyl resin of from about 80 to 90% by weight of vinyl chloride, about 18 to 9% by weight of vinyl acetate and from about 2 to 0.2% of alkyl alpha-beta monoolefinic dicarboxylic acid containing from 3 to 5 carbon atoms; from about 5 to 25% by weight of an acetylated tri-$(C_2-C_4)$ alkyl citrate, from about 2 to 10% by weight of a moistureproof paraffin wax, and from about 1 to 10% by weight of a rosin ester blending agent.

3. A composite sheet for wrapping food products comprising a clear, flexible base sheet and a coating on a surface of said base sheet consisting essentially of from about 75 to 80% by weight of a modified vinyl resin of from about 84 to 88% by weight of vinyl chloride, about 15 to 10% by weight vinyl acetate and about 1.5–0.5% by weight of maleic acid; from 10 to 16% acetyl tributyl citrate, about 2 to 6% maleic anhydride treated rosin, from 2 to 6% paraffin wax having a melting range of from 120 to 175° F., from about 0.1 to 1% of blown vegetable oil, from 0.1 to 1% of an oxidized microcrystalline hydrocarbon wax, and from 0.1 to 1% of clay.

4. The composite sheet of claim 3 wherein the base film is a cellulosic material.

5. The composite sheet of claim 4 wherein the base film is regenerated cellulose.

6. A composite sheet for wrapping food products which consists essentially of a base film of regenerated cellulose and a coating on a surface of said base film consisting essentially of from about 75 to 80% of a modified vinyl resin of from about 84 to 88% by weight of a vinyl chloride, about 15 to 10% by weight of vinyl acetate and about 1.5 to 0.5% by weight of maleic acid; about 12 to 15% by weight acetyl tributyl citrate, about 2 to 6% by weight of maleic anhydride treated rosin, from about 2 to 6% of a paraffin wax melting between 140 and 175° F., about 0.1 to 0.6% blown rapeseed oil, from 0.1 to 0.5% by weight of an oxidized microcrystalline hydrocarbon wax, and from about 0.1 to 0.5% of clay.

References Cited in the file of this patent

UNITED STATES PATENTS

| | | |
|---|---|---|
| 2,329,456 | Campbell | Sept. 14, 1943 |
| 2,492,512 | Zweig | Dec. 27, 1949 |
| 2,528,507 | Foye | Nov. 7, 1950 |
| 2,950,992 | Brillhart et al. | Aug. 30, 1960 |

OTHER REFERENCES

"Plasticizers," second edition, by Buttery, Cleaver-Hume Press, London (1950) pages 52–57.

"Organic Coating Technology," by Payne, John Wiley & Sons (New York, 1954), page 156.